ively with the reel 10 and the device 12.

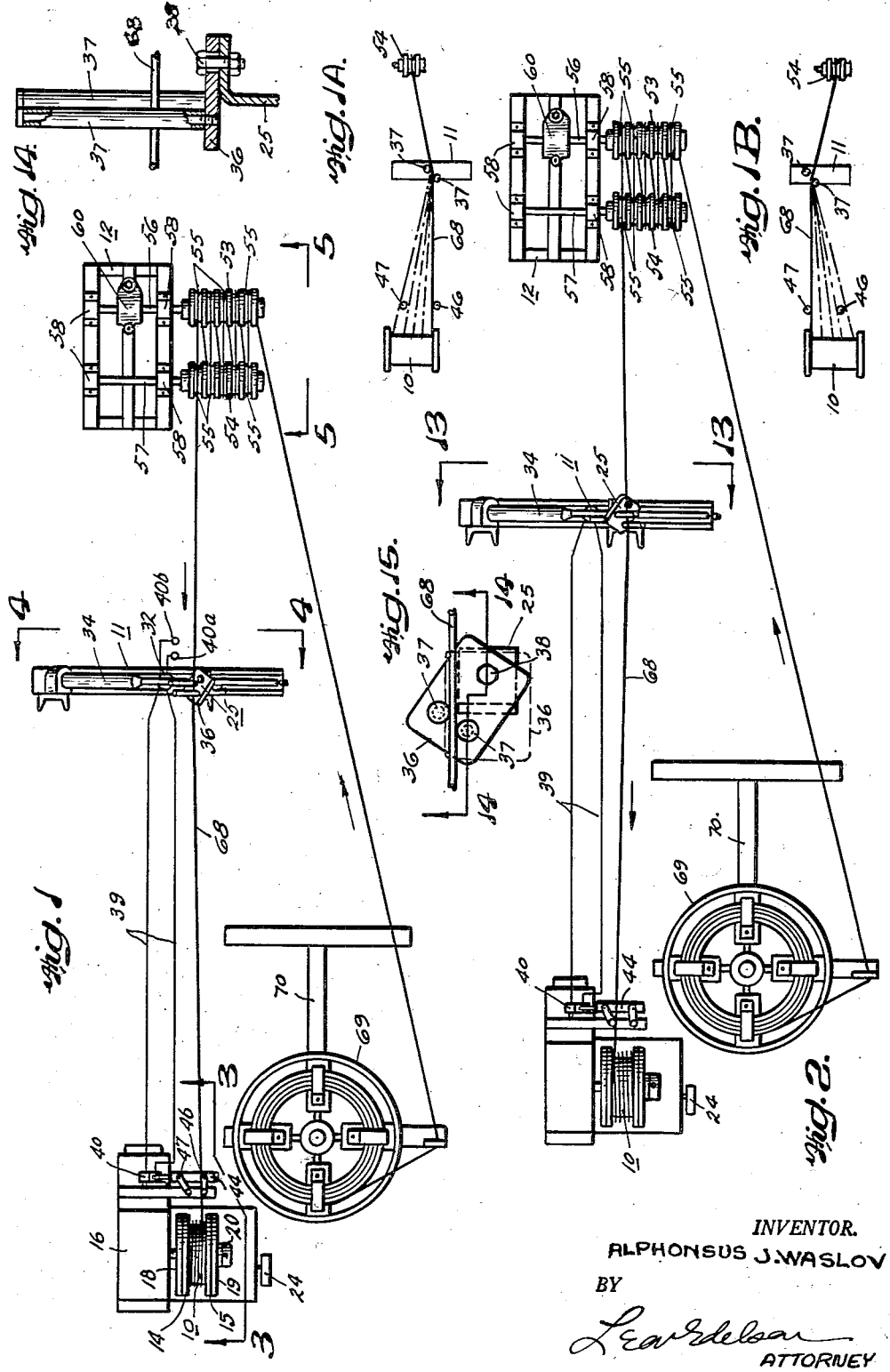

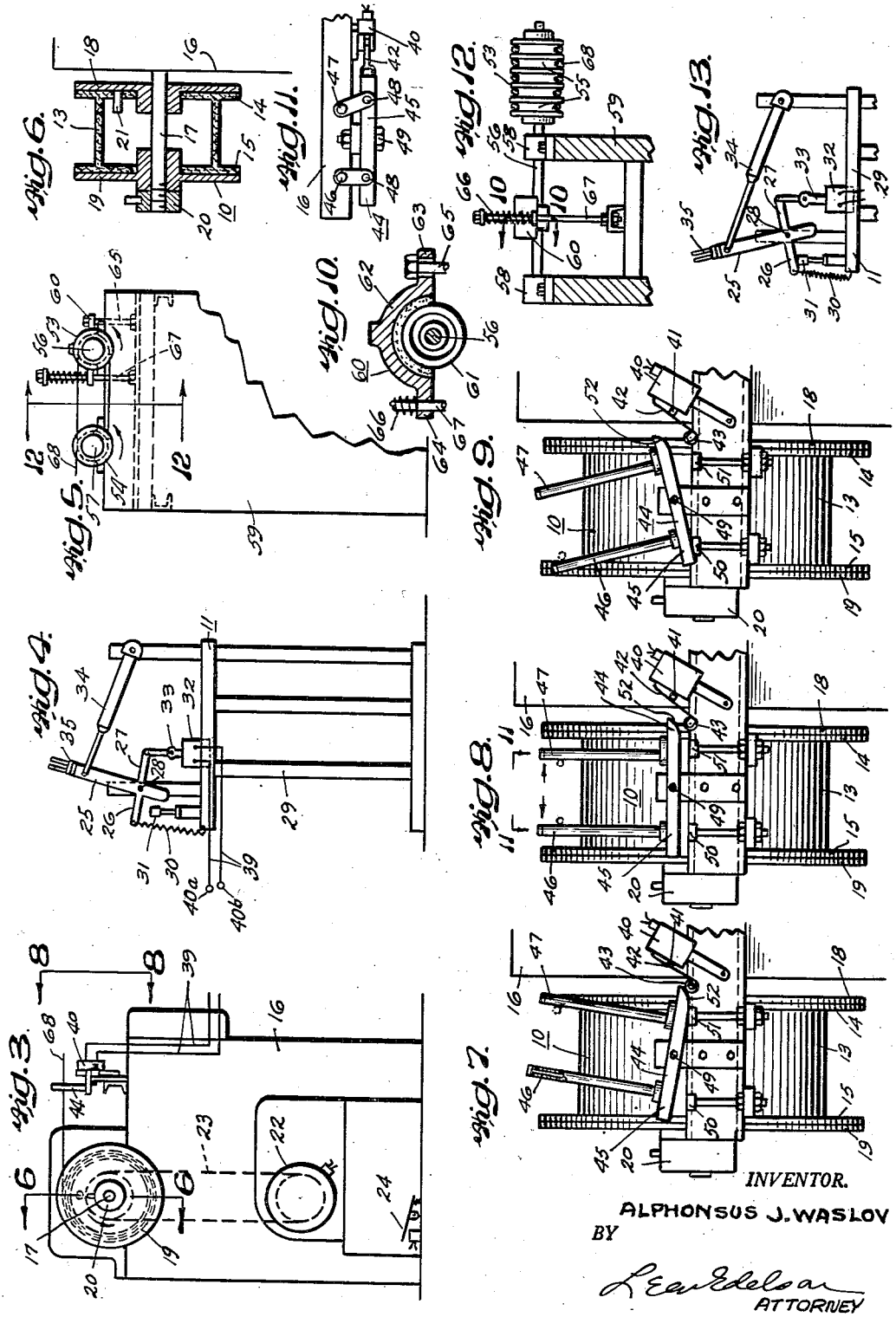

United States Patent Office 2,803,412
Patented Aug. 20, 1957

2,803,412

APPARATUS FOR REELING WIRE

Alphonsus J. Waslov, Gloucester, N. J., assignor, by mesne assignments, to Charles P. Boyd, Devon, Pa.

Application October 11, 1954, Serial No. 461,359

3 Claims. (Cl. 242—25)

This invention relates generally to reeling apparatus and is concerned more particularly with apparatus for level winding a continuous length of wire on a reel in successive layers alternately in opposite directions across the barrel of the reel.

A principal object of the present invention is to provide such an apparatus wherein the wire is straightened out by being drawn taut preliminarily to being wound on the reel.

Another object of the present invention is to provide such an apparatus wherein the taut wire is shifted from side to side automatically at predetermined intervals so as to constantly keep the same slightly canted in the direction opposite to that in which the wire is progressing across the face of the reel.

Still another object of the present invention is to provide such an apparatus wherein the shifting of the wire as aforementioned is initiated by the wire itself as it progresses across the face of the reel.

Other objects and advantages of the present invention will appear more fully hereinafter, it being understood that the invention consists substantially in the combination, construction, location and general arrangement of parts, all as described in detail in the following specification, as shown in the accompanying drawings and as fully pointed out in the appended claims.

In the accompanying drawings:

Figure 1 is a plan view of an apparatus embodying the present invention;

Figures 1A and 1B are diagrammatic plan views showing how the wire is canted while being wound on the reel;

Figure 2 is the same as Figure 1, but shows the wire shifting device in the extreme opposite position;

Figure 3 is an enlarged vertical elevation on the line 3—3 of Figure 1;

Figure 4 is a vertical elevation on the line 4—4 of Figure 1;

Figure 5 is an enlarged vertical elevation on the line 5—5 of Figure 1;

Figure 6 is an enlarged section on the line 6—6 of Figure 3;

Figures 7, 8 and 9 are enlarged views as indicated by the line 8—8 of Figure 3, each showing a different condition of the parts;

Figure 10 is an enlarged section on the line 10—10 of Figure 12;

Figure 11 is a plan view as indicated by the line 11—11 of Figure 8;

Figure 12 is an enlarged section on the line 12—12 of Figure 5;

Figure 13 is a vertical elevation on the line 13—13 of Figure 2;

Figure 14 is a section on the line 14—14 of the Figure 15; and

Figure 15 is a plan view of the head of the wire shifting device.

An embodiment of the present invention may include a gathering reel 10 and wire-guiding means comprising a shifting device 11 and a retarding device 12, the reel 10 and devices 11 and 12 being spaced a substantial distance apart and the device 11 being positioned between the reel 10 and the device 12.

The reel 10 has a hollow cylindrical body 13 provided with a pair of flange forming members 14 and 15 which form a circumferentially extending channel for receiving the wire. For carrying the reel 10, there is provided a floor supported frame structure 16 which has a shaft 17 mounting a pair of disks 18 and 19. The disk 18 is conventionally fixed, and the disk 19 is slidably fitted, on the shaft 17. The reel 10 is mounted on the shaft 17 between the disks 18 and 19, the latter being provided respectively with a pair of hubs which project inwardly through the flange forming members 14 and 15 of the reel 10. For securing the reel 10 and the disk 19 against shifting axially on the shaft 17, the latter is provided with a threaded collar 20, and for insuring rotation of the reel 10 with the shaft 17 and disks 18 and 19, the disk 18 is provided with a pin 21 which projects inwardly through the flange forming member 14 of the reel 10. The reel 10 is turned by an electric motor and speed reducing unit which is indicated by the numeral 22, the unit 22 being operatively connected to the reel 10 through the medium of the shaft 17 and a chain drive 23. It will be understood that there is provided suitable means for controlling the unit 22, of which means only the portable switch actuating pedal 24 is shown.

The shifting device 11 of the wire-guiding means comprises an elongated shifting member 25 which is provided with a pair of arms 26 and 27 extending laterally therefrom in opposite directions. The shifting member 25 is disposed in an upright position, being pivotally mounted as by a bolt 28 on a floor supported frame structure 29. Referring particularly to Figure 13, the arm 26 is connected to the frame structure 29 by a tension spring 30, the shifting member 25 being held thereby in one tilted extreme position with the arm 26 in engagement with a stop 31. A solenoid 32 is mounted on the frame structure 29, and the solenoid plunger 33 is connected to the arm 27 of the shifting member 25. When the solenoid is energized, the plunger 33 moves downwardly, and the shifting member 25 is rocked against the force of the tension spring 30 from its initial tilted extreme position shown in Figure 13 to the opposite tilted extreme position shown in Figure 4. When the solenoid 32 is again de-energized, the tension spring 30 contracts and the shifting member 25 is rocked back to its initial tilted extreme position. A conventional check 34 is provided to prevent undue jarring of the shifting member 25. The upper end of the latter carries a head 35 which is in the form of a base plate 36 and a pair of laterally spaced pins 37—37 projecting upwardly therefrom. The head 35 is pivotally mounted for swinging movement of the pins 37—37 in an arc about a bolt 38 which is projected through the base plate 36.

For controlling the action of the shifting member 25, the solenoid 32 is connected, as by wiring 39 (see Figure 1), in electric circuit with an electric switch 40 which is mounted on the frame structure 16, and with a pair of terminals, designated 40a—40b, connected with a suitable source of electric power. The switch 40 has a push button 41 and a flexible arm 42 for depressing the same, the arm 42 being provided with a roller 43. The frame structure 16 also carries a switch-actuating frame 44 which is in the form of a base part 45 mounting a pair of laterally spaced similar upright bars 46 and 47 each mounted for swinging movement in an arc about a bolt 48 (see Figure 11). Referring particularly to Figures 7, 8 and 9, the switch-actuating frame 44 is pivotally mounted on a bolt 49 for rocking movement which is limited by the engagement of the opposite end portions of the base part 45 respectively with a pair of stops 50 and 51. One end portion of the base part 45 is rounded as at 52 and is disposed for engaging the roller 43 of the switch arm 42. Referring particularly to Figure 9, the switch-actuating frame 44 is shown in one tilted extreme position, wherein the base part 45 is engaged with the stop 50, and the rounded portion 52 of the base part 45 is disengaged from the roller 43 of the switch arm 42. In this condition of the parts, the switch 40 is open and the solenoid 32 de-energized. Referring particularly to Figure 7, the switch-actuating frame 44 is shown in the opposite tilted extreme position wherein the base part 45 is engaged with the stop 51, and the rounded portion 52 of the base part 45 is engaged with the roller 43 of the switch arm 42. In this condition of the parts, the switch 40 is closed, and the solenoids 32 is energized. The condition of the parts intermediate the tilted extreme conditions shown in Figures 9 and 7 is shown in Figure 8.

The retarding device 12 of the wire-guiding means comprises a pair of similar rollers 53 and 54 each of which is provided with a series of axially spaced circumferentially extending grooves 55. The rollers 53 and 54 are conventionally fixed respectively on a pair of shafts 56 and 57 which are journalled as at 58 on a floor supported frame structure 59. For resisting rotation of the shaft 56 and the roller 53, there is provided a brake device 60 (see Figures 10 and 12) which includes a drum 61 fixed on the shaft 56 and a shoe 62 arranged for coaction with the drum 61. The shoe 62 extends about the upper one-half portion of the drum 61 and terminates in a pair of ears 63 and 64 respectively on the opposite sides of the shaft 56, being hingedly connected to the frame structure 59 by a bolt 65 which projects loosely through the ear 63, and being constantly urged into frictional engagement with the drum 61 by a compression spring 66 arranged on a bolt 67 projected through the ear 64, the bolt 67 being anchored to the frame structure 59.

For the purpose of illustration, the wire 68 which is to be gathered on the reel 10 is shown as initially wound on a much larger supply reel 69, the latter being revolubly mounted on any suitable floor supported frame structure 70 disposed within easy reach of the operator at his station near the gathering reel 10. The wire 68 extends from the supply reel 69 to the retarding device 12 where it is wrapped about the rollers 53 and 54 a number of times, engaging in a pair of opposed grooves 55—55 respectively of the rollers 53 and 54 in passing over the rollers and engaging in a pair of axially offset grooves respectively of the rollers 53 and 54 in passing under the rollers. In this connection, it will be noted that the innermost pair of opposed grooves 55—55 respectively of the rollers 53 and 54 are disposed along the axially central plane of the gathering reel 10, i. e., the plane disposed normal to the axis of the gathering reel 10 and centrally between the flange forming members 14 and 15. Then the wire 68 extends to the shifting device 11 and engages the head 35 of the shifting member 25, passing freely through the same over the base plate 36 and between the pins 37—37. From the head 35 the wire 68 extends to and through the switch actuating frame 44, passing over the base part 45 and between the bars 46 and 47 and then to the gathering reel 10.

In the operation of the apparatus, the foot-pedal 24 is depressed, whereupon the motor and speed reducer unit 22 is actuated. Since the unit 22 is operatively connected to the gathering reel 10 through the medium of the chain drive 23 and the shaft 17, the gathering reel 10 is rotated thereby and the wire 68 is drawn from the supply reel 69 to the gathering reel 10 along the course just described and against the resistance induced by the action of the brake device 60, as a consequence of which the wires 68 is effectively straightened out before being gathered on the reel 10.

In the condition of the apparatus shown in Figure 1, the wire 68 has progressed a substantial distance from the flange 14 toward the flange 15, i. e., from right to left across the face of the reel 10, as a consequence of which it has just engaged the bar 46 of the switch-actuating frame 44. At this stage of the operation the switch-actuating frame 44 is tilted to the right as shown in Figure 7, the switch 40 is closed and the shifting member 25 is tilted to the right as shown in Figure 4. Further progress of the wire 68 toward the flange 15 causes the switch-actuating frame 44 to rock on the bolt 49 to the upright position shown in Figure 8, as a consequence of which the switch 40 opens and the solenoid 32 is de-energized, the tension spring 30 contracts and the shifting member 25 rocks to the left about the bolt 28 to the position shown in Figure 13. Still further progress of the wire 68 causes the switch-actuating frame 44 to continue its rocking movement to the left and to assume the position shown in Figure 9, the condition of the apparatus at this stage of the operation being shown diagrammatically in Figure 1A. After the wire 68 reaches the flange 15, it will double back toward the flange 14 and will be wound in the next layer from left to right across the face of the gathering reel 10.

When the wire 68 has progressed a substantial distance toward the flange 14, it engages the bar 47 of the switch-actuating frame 44. Further progress causes the switch-actuating frame 44 to rock to right back to its upright position. Still further progress causes the switch-actuating frame 44 to continue its rocking movement to the right and to again assume the position shown in Figure 7, as a consequence of which the switch 40 closes and the solenoid 32 is energized, the solenoid plunger 33 is drawn downwardly and the shifting member 25 is rocked to the right against the force of the tension spring 30 to the position shown in Figure 4, the condition of the apparatus at this stage of the operation being shown diagrammatically in Figure 1B. After the wire 68 reaches the flange 14, it will double back toward the flange 15 and will be wound in the next layer from right to left across the face of the gathering reel.

The switch-actuating frame 44 is rocked alternately from one tilted extreme position to the other by the wire 68, being so balanced on the bolt 49 that after being tilted in one direction by engagement of the wire 68 with one of the upright bars of the switch-actuating frame 44, it remains so tilted until rocked in the opposite direction by engagement of the wire 68 with the other of the aforementioned upright bars. Correspondingly, the switch 40 is alternately open and closed, and the shifting member 25 is rockably shifted alternately from one tilted extreme position to the other, the shifting of the member 25 being so timed that the wire 68 is constantly canted in the direction opposite to that in which the wire 68 is progressing across the face of the gathering reel 10. In this way, each turn of the wire 68 in a layer thereof is wound tight against the next preceding turn.

By swinging the head 35 about the pivot bolt 38, the pins 37—37 may be arranged to accommodate various sizes of wire. In addition, by swinging the bars 46 and 47 about the bolts 48, the switch-actuating frame may be adjusted to accommodate gathering reels which vary in axial length.

It will be understood, of course, that the apparatus hereinabove shown and described is susceptible of various changes and modifications which may be made from time to time without any departure from the general principles or real spirit of the invention. For example, it is not essential to supply the wire 68 on a reel such as the supply reel 69. Other means might be substituted therefor; and, indeed, the wire might be supplied in a loose unmounted condition. In addition, it is not necessary that shifting member 25 be rockably mounted, a member that shifts rectilinearly might be substituted. Still further, it is not necessary that the retarding device 12 be in the form shown and described; instead, the wire might be passed through a sleeve arranged to frictionally engage the wire and to thereby retard the same. Accordingly, it is intended to claim the present invention broadly, as well as specifically, as indicated in the appended claims.

What is claimed as new and useful is:

1. In a wire-reeling apparatus, a revoluble reel, a device for retarding movement of the wire, a device for shifting the wire, said devices being radially spaced a substantial distance from said reel and from one another and said shifting device being disposed between said retarding device and reel, said retarding device being provided with the revoluble roller having a wire-engaging portion disposed along the axially central plane of said reel, and means for turning said reel against resistance by said retarding device to draw the wire from said wire-engaging portion and to wind the same on said reel, said shifting device including a member mounted for swinging movement in a plane generally parallel to the axis of said reel and rockable in said plane for automatically shifting the wire alternately in opposite directions axially of said reel at predetermined intervals while the wire is continuously wound in opposite directions in successive layers across the face of said reel, and means for actuating said shifting device including an element yieldably securing said shifting device in one of its extreme positions, a solenoid, a switch connected in electric circuit with said solenoid, and a switch-actuating member responsive to predetermined different positions of the wire alternately to close said switch and thus energize said solenoid and to open said switch and thus de-energize said solenoid, the latter being operatively connected to said shifting device for rocking the latter against the force of said yieldable element when energized, and said shifting device being always positioned to constantly keep the wire about to be wound on said reel canted in the direction axially of said reel opposite to that in which the winding is progressing.

2. In a wire-reeling apparatus, a revoluble reel, a device for retarding movement of the wire, a device for shifting the wire, said devices being radially spaced a substantial distance from said reel and from one another and said shifting device being disposed between said retarding device and reel, said retarding device being provided with a revoluble roller having a wire-engaging portion disposed along the axially central plane of said reel, and means for turning said reel against resistance by said retarding device to draw the wire from said wire-engaging portion and to wind the same on said reel, said shifting device including a member mounted for swinging movement in a plane generally parallel to the axis of said reel and rockable in said plane for automatically shifting the wire alternately in opposite directions axially of said reel at predetermined intervals while the wire is continuously wound in opposite directions in successive layers across the face of said reel, and means for actuating said shifting device including an element yieldably securing said shifting device in one of its extreme positions, a solenoid, a switch connected in electric circuit with said solenoid, and a switch-actuating member mounted for rocking movement in a plane generally parallel to the axis of said reel and arranged and formed to engage the wire whenever the latter is about to reverse the direction of its travel across the face of said reel, whereby said switch-actuating member is rocked by said wire so as to alternately close said switch and thus energize said solenoid and open said switch and thus de-energize said solenoid, the latter being operatively connected to said shifting device for rocking the latter against the force of said yieldable element when energized, and said shifting device being always positioned to constantly keep the wire about to be wound on said reel canted in the direction axially of said reel opposite to that in which the winding is progressing.

3. In a wire-reeling apparatus, a revoluble reel, a device for retarding movement of the wire, a device for shifting the wire, said devices being radially spaced a substantial distance from said reel and from one another, said shifting device being disposed between said retarding device and reel, and said retarding device being provided with a revoluble roller having a wire-engaging portion disposed along the axially central plane of said reel, and means for turning said reel against resistance by said retarding device to draw the wire from said wire-engaging portion and to wind the same on said reel, said shifting device including a member mounted for swinging movement in a plane generally parallel to the axis of said reel and rockable in said plane for automatically shifting the wire alternately in opposite directions axially of said reel at predetermined intervals while the wire is continuously wound in opposite directions in successive layers across the face of said reel, and means for actuating said shifting device including an element yieldably securing said shifting device in one of its extreme positions, a solenoid, a switch connected in electric circuit with said solenoid, and a switch-actuating member in the form of a pivotally mounted frame having a pair of bars spaced axially of said reel and disposed in close proximity to said reel to engage the wire whenever the latter is about to reverse the direction of its travel across the face of said reel, whereby said switch-actuating frame is rocked by said wire so as to alternately close said switch and thus energize said solenoid and open said switch and thus de-energize said solenoid, the latter being operatively connected to said shifting device for rocking the latter against the force of said yieldable element when energized, and said shifting device being always positioned to constantly keep the wire about to be wound on said reel canted in the direction axially of said reel opposite to that in which the winding is progressing.

References Cited in the file of this patent

UNITED STATES PATENTS

| | | |
|---|---|---|
| 471,571 | Robinson | Mar. 29, 1892 |
| 1,166,948 | Underhill | Jan. 4, 1916 |
| 1,351,867 | Oakes | Sept. 7, 1920 |
| 1,816,909 | Larsen | Aug. 4, 1931 |
| 1,964,530 | Newton et al. | June 26, 1934 |
| 2,539,667 | King | Jan. 30, 1951 |

FOREIGN PATENTS

| | | |
|---|---|---|
| 474,168 | France | Nov. 6, 1914 |
| 667,788 | France | June 25, 1929 |